United States Patent [19]

Blunden et al.

[11] 3,854,424
[45] Dec. 17, 1974

[54] TIE-DOWN AND LOCKING SYSTEM
[75] Inventors: Donald J. Blunden, Southfield; Israel D. Peisner, Huntington Woods, both of Mich.
[73] Assignee: Whitehead & Kales Company, River Rouge, Mich.
[22] Filed: May 16, 1973
[21] Appl. No.: 360,766

Related U.S. Application Data
[63] Continuation-in-part of Ser. No. 342,385, March 19, 1973.

[52] U.S. Cl. ...... 105/368 T, 105/369 A, 248/119 R
[51] Int. Cl. .............................................. B60p 7/08
[58] Field of Search ........ 105/368 T, 369 A, 368 R; 280/179 A; 248/361 A, 119 R; 292/60, 266, 278

[56] References Cited
UNITED STATES PATENTS
| | | | |
|---|---|---|---|
| 3,331,334 | 7/1967 | Broling | 105/369 A |
| 3,465,691 | 9/1969 | Simmons | 105/369 A X |
| 3,589,304 | 6/1971 | Haynes | 105/369 A |
| 3,650,222 | 3/1972 | Broling | 105/369 A |
| 3,673,969 | 7/1972 | Peisner et al. | 105/369 A |
| 3,715,994 | 2/1973 | Mietla | 105/369 A X |

*Primary Examiner*—M. Henson Wood, Jr.
*Assistant Examiner*—Gene A. Church
*Attorney, Agent, or Firm*—Whittemore, Hulbert & Belknap

[57] ABSTRACT

Apparatus for securing a plurality of vehicles on the deck of a transport such as a rail car. The apparatus comprises tie-down assemblies each having a carriage and two chains which secure a vehicle against both fore and aft movement. The carriages are supported in a guide rail extending lengthwise of the deck. Locking means are provided to simultaneously lock all of the carriages in adjusted position, such locking means comprising a rotatable bar having spaced locking lugs along its length interengageable with spring-loaded lugs on the carriages.

16 Claims, 16 Drawing Figures

FIG.7 under a different patent number 3,854,424

TIE-DOWN AND LOCKING SYSTEM

REFERENCE TO RELATED APPLICATION

This application is a continuation-in-part of our co-pending application Ser. No. 342,385, filed Mar. 19, 1973.

BACKGROUND AND SUMMARY OF THE INVENTION

The apparatus of this invention comprises tie-down assemblies which are adapted to be connected to the underframes of the vehicles by flexible members such as chains in a manner which secures the vehicles against both fore and aft movement. In accordance with a preferred embodiment, each such tie-down assembly has a carriage connected to the underframe of the vehicle by front and rear chains. The carriage and two chains form a triangle. The front chain prevents the vehicle from moving rearwardly and the rear chain prevents the vehicle from moving forwardly. The chains provide a flexible tie so as to reduce the stresses on the underframe of the vehicle. The chains are connected to the carriage in a novel manner which permits them to be readily tightened to take up slack or to be released.

Further in accordance with a preferred embodiment, the carriages are longitudinally adjustably positioned in a guide rail which extends lengthwise of the deck of the transport. The tie-down assemblies may be hooked to the vehicle underframes and the desired amount of chain tension applied just before the vehicles are driven onto the deck of the transport. The carriages may be guided into the open end of the guide rail and dragged along to the point on the deck where it is desired to anchor the vehicle. The chains preferably are set at an angle of about 45° to the deck, so that the carriages may be easily dragged along the guide rail whether the vehicle is loaded in a forward or a reverse direction.

The invention also includes means for locking the carriages in adjusted position in the guide rails which preferably comprises a bar supported for rotation at one side of the rail and having a plurality of locking lugs interengageable with corresponding lugs on each carriage to simultaneously lock all of the carriages when the bar is rotated. The locking lugs on each carriage are springloaded plungers and are so spaced relative to the lugs on the bar as to lock against the remote sides of two lugs or alternatively to lock against the adjacent sides of two lugs. It is obvious that a linearly movable locking bar could be employed instead of one which rotates.

Other objects and features of the invention will become apparent as the description proceeds, especially when taken in conjunction with the accompanying drawings, wherein.

Referring now more particularly to the drawings, a rail car 10 is shown having an elongated horizontal deck 12 which extends lengthwise of the rail car and preferably is open at both ends of the rail car and of sufficient width to carry the vehicles to be transported with at least minimum clearance. The rail car may have a single deck or it may be a multi-level rail car having upper decks in addition to the lower deck.

A pair of laterally spaced parallel channel guides or rails 14 are mounted lengthwise upon the deck 12 of the rail car. They are spaced apart a distance somewhat less than the spacing between the parallel tracks 16 for the ground-engaging wheels 18 of the vehiles V. The tracks 16 are of course parallel to one another and extend the full length of the rail car.

Figure 1:
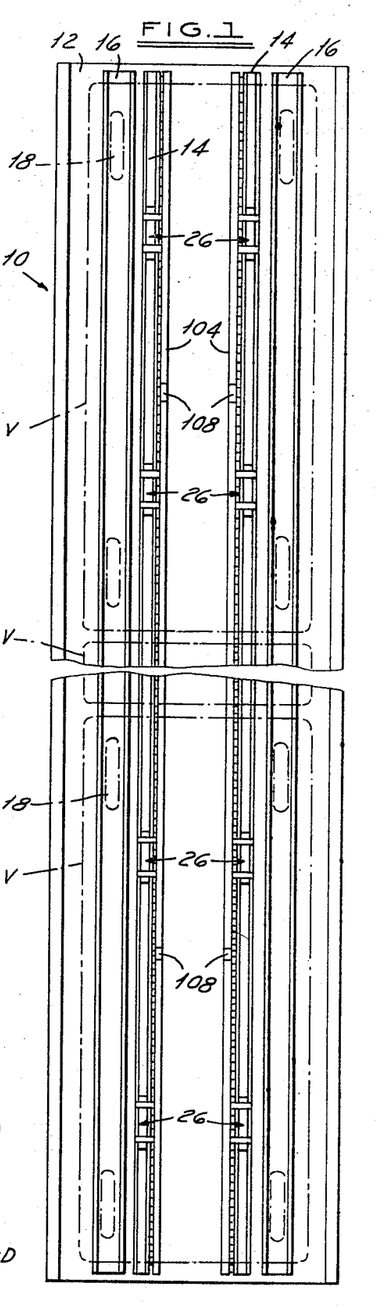
FIG. 1 is a semi-diagrammatic plan view with portions broken away looking down on the deck of a rail car and showing a tie-down system constructed in accordance with our invention. The tied down vehicles are shown in dot-dash lines.
Figure 2:
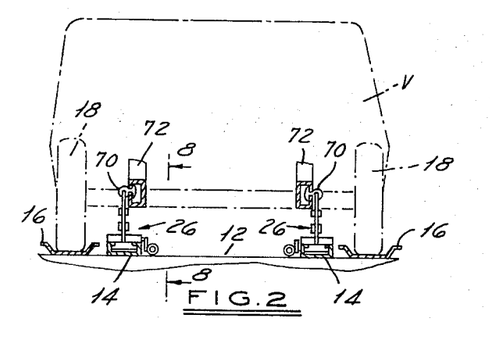
FIG. 2 is an end view of the tie-down system showing the tie-down chains hooked to the underframe of a vehicle and the carriages locked in the guide rails by the rotatable locking bars.
Figure 7:
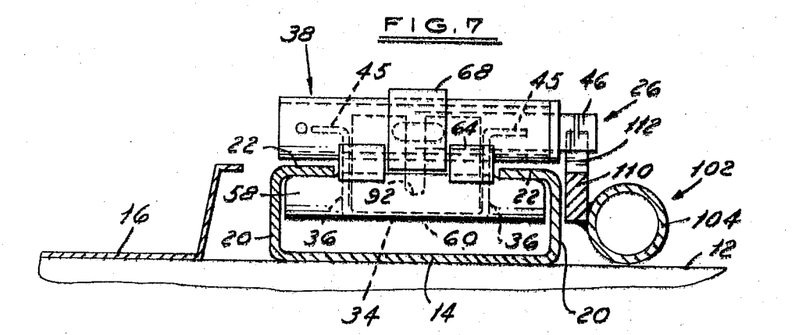
FIG. 7 is a sectional view taken on the line 7—7 in FIG. 9 showing the carriage in end elevation.

The channel guides 14 have the configuration best shown in FIGS. 2 and 7. They are of generally channel form and are open ended having their bottom walls rigidly secured as by welding or other suitable means upon the deck 12. The open ends of the channel guides 14 preferably terminate substantially flush with the ends of the deck 12 as shown in FIG. 1. Each channel guide 14 has the laterally upright side walls 20 terminating at their upper ends in horizontally inturned flanges 22 whose inner edges are spaced apart to define an elongated slot 24 extending from end to end of the channel guide.

The vehicles V are secured in fixed positions upon the deck of the rail car by front and rear tie-down devices or assemblies 26 secured to the underframe portion of the vehicle on each side thereof. Each such tie-down assembly includes front and rear chains 28 and 30 and a carriage 32. The two tie-down assemblies on one side of a vehicle are disposed one behind the other in positions such that the carriages 32 thereof engage one of the channel guides 14. The other two tie-down assemblies on the other side of the vehicle are disposed one behind the other in positions such that the carriages 32 thereof engage the other channel guide 14. It is not necessary to employ four of the tie-down assemblies 26. Each vehicle may, for example have only two, one having its carriage engaged in one channel guide 14 and the other having its carriage engaged in the same or the other channel guide.

Each carriage 32 comprises an elongated body preferably in the form of channel 34. The distance between the side walls 36 of channel 34 is slightly less than the width of the slot 24 in the channel guide 14 so that the channel 34 may fit down into the channel guide through the slot as shown in FIG. 7.

Locking lug units or assemblies 38 and 40 of identical construction are provided on each carriage. Each locking unit 38, 40 comprises an elongated open ended cylinder 42 of uniform circular cross section which is rigidly secured as by welding to the channel 34 in recesses 44 formed in the upper edges of the side flanges 36 adjacent opposite ends of the channel and also secured as by welding to the outturned flanges 45 at the upper edges of side flanges 36. These cylinders 42 extend at right angles to the longitudinal center line of the carriage body or channel. An elongated locking lug or plunger 46 is reciprocable in each cylinder. The plunger 46 is preferably of rectangular cross section as shown and serves as a locking lug. The plunger extends outwardly beyond one end of the cylinder through a cap 48 secured to the end of the cylinder and having the same internal cross section as the plunger can slide axially in the cylinder but cannot rotate.

Figure 5:
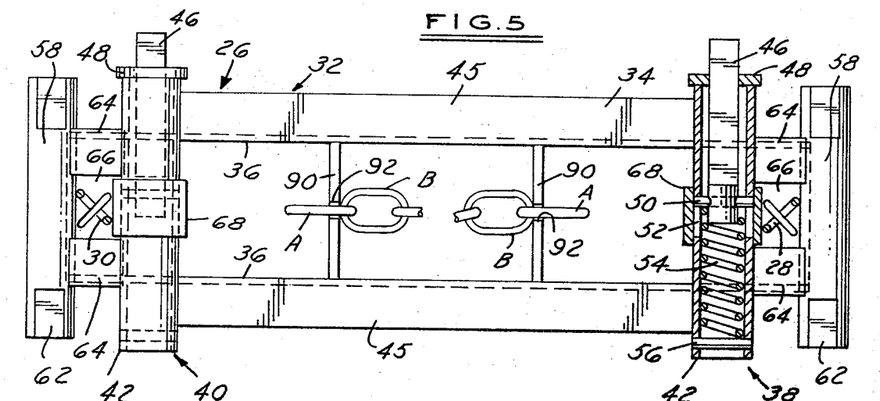
FIG. 5 is a plan view of a carriage forming a portion of one of the tie-down assemblies.

A transverse pin 50, which may be a roll pin, is secured in a hole through the plunger and has its opposite ends extending into the diametrically opposite axially extending slots 52 in the cylinder wall. The plunger 46 is spring urged to its extended position shown in FIG. 5 by a compression coil spring 54 in the cylinder compressed between the roll pin 50 carried by the plunger and a roll pin 56 which extends across the diameter of the cylinder and has its ends firmly secured in holes in the cylinder wall. The limits of axial movement of the plunger 46 to extended and retracted positions is determined by the length of the slots 52 in the cylinder wall.

A transverse bar 58 is provided at each end of the body or channel 34 of the carriage. These bars are secured as by welding to the base or web 60 of the channel and to the side flanges 36 thereof and extend laterally outwardly beyond the side walls of the channel, being adapted to engage under the inturned flanges 22 of the channel guide 14 as in FIG. 7 to prevent the carriage from lifting out of the channel guide. The top surfaces at the ends of the bars 58 are formed as flats 62 to provide a smooth surface-to-surface engagement with the inturned flanges 22.

Preferably plates 64 are secured as by welding to the tops of the inclined upper edges of the side flanges 36 of the channel 34 between the cylinders 42 and the bars 58. These plates 64 may also be welded both to the cylinders 42 and the bars 58 to form a more rigid structure. Such plates 64 are spaced apart to define between them a space or tunnel 66 through which the chains 28, 30 extend from the channel 34 up to the vehicle underframe. Preferably, a sleeve 68 is rotatably mounted on each cylinder 42 between the plates 64 which is free to turn on the cylinder to provide a bearing for the chain.

Figure 3:
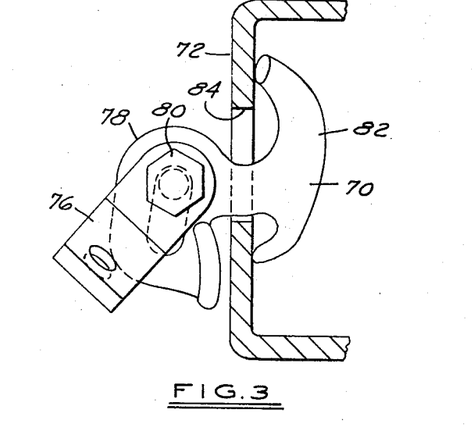
FIG. 3 is an enlarged fragmentary view with parts in section of a portion of FIG. 2 showing the connection between the hook at the ends of the forward and rear chains of a tie-down device with the vehicle underframe.
Figure 8:
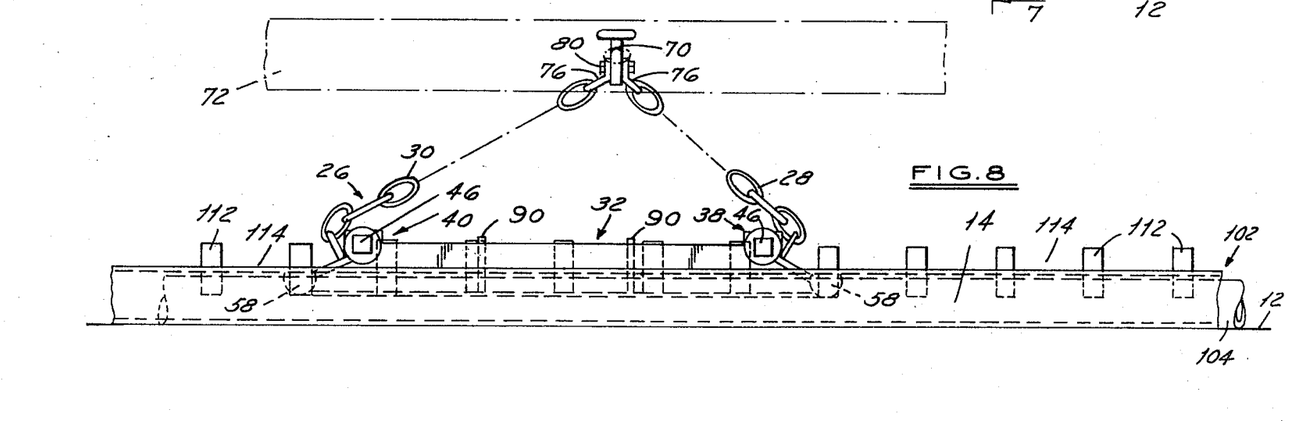
FIG. 8 is an enlarged side elevational view taken on the line 8—8 in FIG. 2.

The ends of the chains 28, 30 are secured to a hook 70 which is adapted to be connected to the underframe portion 72 of the vehicle. The hook 70 may be of any suitable construction although particularly good results are obtained by the use of an R-hook of the type shown in U.S. Pat. No. 3,215,390 to Lewis K. DeShetler, issued to Whitehead & Kales Company, the assignee of this application. As best shown in FIGS. 3 and 8, the end link of each chain 28, 30 is connected to an angle bracket 76 which is secured to the body portion 78 of the R-hook by a nut and bolt assembly 80 extending through apertures in the bracket 76 and in the body portion of the R-hook. The R-hook has a retaining portion 82 which is adapted to extend through an aperture 84 in the side of the underframe portion 72 of the vehicle to attach the tie-down assembly thereto.

Figure 6:
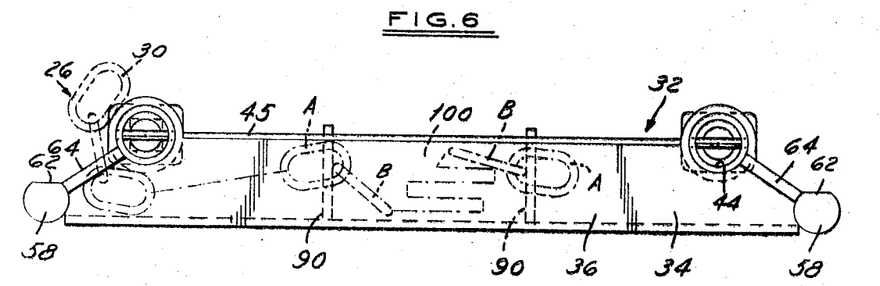
FIG. 6 is a side elevational view of the carriage.

Means are provided on the carriage to tension each chain 28, 30 and for this purpose transverse anchor plates 90 are rigidly secured in the channel 34 of each carriage as by being welded to the base or web 60 and side flanges 36 thereof. Such plates 90 are preferably disposed vertically in longitudinally spaced relation to one another and each has a slot 92 of a width slightly greater than the thickness but less than the width of the chain links. Such slots extend downwardly from the top edge of the plates 90 and are adapted to receive one of the links A of the chain when turned on edge with respect to the slot but to retain the tension in the chain 28 or 30 by the next adjacent link B which is turned crosswise of the slot. (See FIG. 6) The unused portions of the chain, that is the portions not in tension simply accumulate in the reservoir or space 100 provided between the plates. Preferably, although not necessarily, the chains 28 and 30 are portions of the same continuous member being connected together in the reservoir as shown in FIG. 6.

Reference is now made particularly to FIGS. 8-14 for a description of the mechanism for locking the carriages and hence securing the vehicles in loaded position on the deck 12 of the rail car. Such mechanism includes an elongated locking member or bar 102 which is parallel to and extends along the inboard side of each channel guide 14. Each of the bars 102 comprises elongated tubular bar segments 104 which are arranged in spaced end-to-end relation and are connected by short bar sections 106 telescoped within and secured to the adjacent ends of the segments as for example by pins 107. The bars 102 are supported for rotation by the tubular pillow blocks 108 which rotatably receive the connecting sections 106 and are seated upon and secured to the deck 12. The pillow blocks 108 restrain the bars 102 from longitudinal movement by contact with the ends of the bar segments 104. The upper surfaces of the pillow blocks are preferably of the same arcuate size and form as the tubular bar segments 104 and are flush with the upper surfaces of such bar segments so that nothing will catch on either the pillow blocks or the bar segments when the carriages move through the channel guides.

Clamping or locking members 110 are rigidly secured to the bar segments 104 by any suitable means as for example by welding. Such locking members 110 are in the form of elongated flat plates which are notched along their upper edges to provide the equally spaced locking lugs 112 separated by spaces 114. Such locking lugs are preferably rectangular in form and extend at right angles to the axis of the locking bar segments 104 on which they are mounted. The spacing between all of the locking lugs 112 throughout the entire length of each locking bar 102 and across the pillow blocks 108 is uniform. It is noted in FIG. 11 that the end lugs 112 on the bar segments 104 extend beyond the bar segments and overlap slightly the intervening pillow blocks 108 to preserve the continuous uniform spacing of the locking lugs even across the pillow blocks. In order that the pillow blocks do not interfere with the overlapping end portions of the plates 110 on which the locking lugs are formed, such ends of the plates 110 are cut back as indicated at 116.

Figures 9, 10:
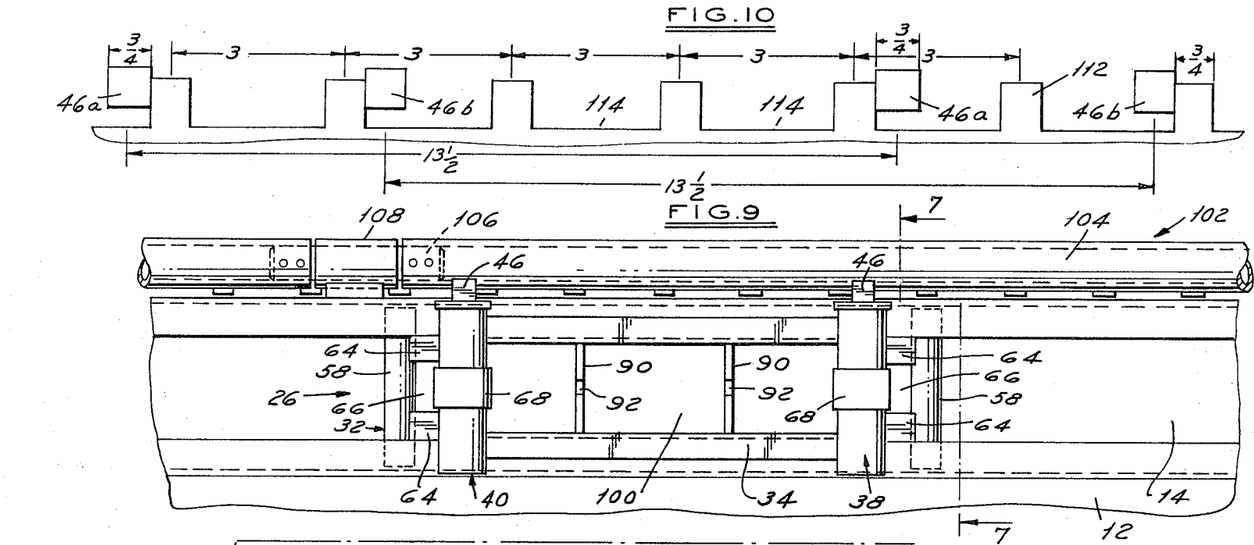
FIG. 9 is a fragmentary plan view of the carriage shown mounted in a channel guide and of the locking bar associated therewith.
FIG. 10 is a fragmentary view in side elevation showing the dimensional relationship between the lugs on the locking bar and the lugs on a carriage.
Figure 11:
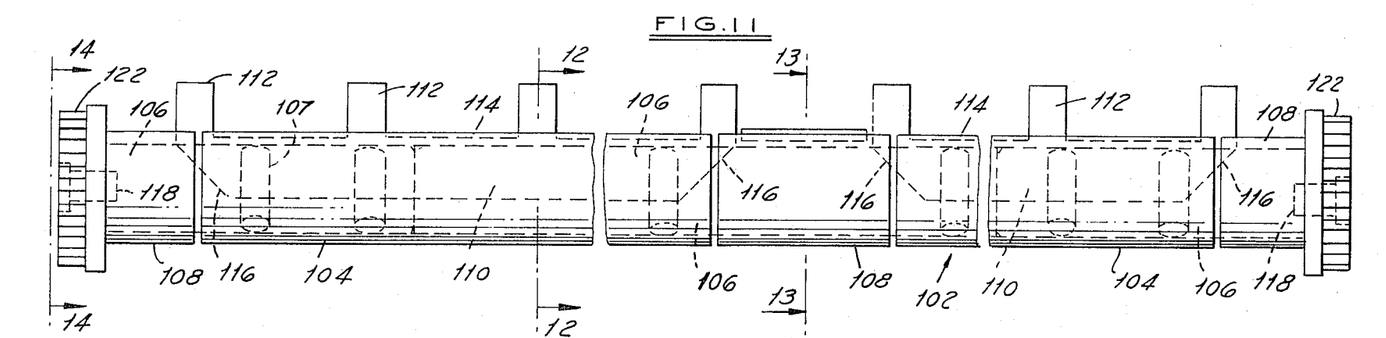
FIG. 11 is a side elevational view with parts broken away of the locking bar.

Both ends of the locking bar 102 extend substantially flush with the ends of the rail car. Such locking bar ends are preferably formed with non-circular sockets 118 or with flats or the like to receive a tool or crank by means of which the bar may be rotated manually between the retracted position shown in dotted lines in FIG. 12 and the locking position in which the locking plates 110 are vertical as shown in solid lines therein. When in the locking position, the locking lugs 112 are vertical, as shown, in positions to the interengage with the plungers 46 on the carriages to lock the carriages against longitudinal movement. As seen in FIG. 9, the plungers when extended are adapted to project across the plane of the vertical locking plate and through the spaces 114 between the lugs 112.

If the locking bar 102 is considered to be too long for convenient operation from one end, it may if desired be cut in half, that is transversely severed at or near the midpoint in which event the locking lugs adjacent one end of the rail car would be simultaneously operated by one of the locking bar halves and the locking lugs adjacent the other end of the rail car would be simultaneously operated by the other locking bar half.

Figure 12:
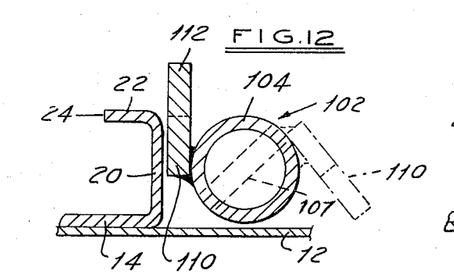
FIG. 12 is a fragmentary sectional view taken on the line 12—12 in FIG. 11.
Figure 13:
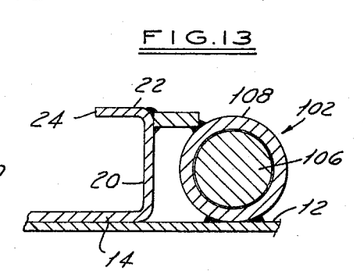
FIG. 13 is a fragmentary sectional view taken on the line 13—13 in FIG. 11.
Figure 14:
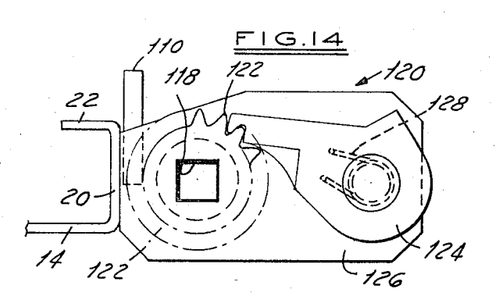
FIG. 14 is a fragmentary elevational view taken on the line 14—14 in FIG. 11.

A ratchet assembly 120 is provided for each end of the locking bar 102 to releasably lock it in its locking position shown in solid lines in FIG. 12 and shown also in FIG. 14. Each ratchet assembly 120 includes a ratchet gear 122 on the end of the locking bar and a pawl 124 mounted on a plate 126 secured as by welding to the channel guide and the deck of the rail car. The pawl is urged by a spring 128 to its operative position shown in FIG. 14 in engagement with the teeth of the ratchet gear, but may be retracted clockwise by hand from the FIG. 14 position to release the locking bar for rotation to its retracted position.

FIG. 10 shows the dimensional relationship between the lugs 112 on the locking bar 102 and the plungers 46 on each carriage. As there shown, the adjacent vertical sides of the two plungers 36 of a particular carriage may tightly engage the remote vertical sides of two locking lugs 112 (see plungers 46a) or the remote vertical sides of the plungers may tightly engage the adjacent vertical surfaces of two locking lugs 112 (see lugs 46b). The confronting edges of the vertical sides of the plungers and the lugs may be beveled to facilitate their engagement. The dimensional relationship required to achieve this locking characteristic of the assembly such that the plungers may be locked tight against relative movement in either of two positions relative to the locking bar may vary, but in the present instance is accomplished by employing locking lugs of ¾ inch width on 3-inch centers and plungers of ¾ inch width which are spaced from one another on each carriage a distance of 13½ inches. The two plungers of a given carriage may lock in either one of the two positions shown as will be apparent.

Referring further to FIG. 10, the distance between the inner sides of the plungers in position 46a will be seen to be equal to four times the distance between centers of lugs 112 plus the width of one lug 112, and the distance between the outer sides of the plungers in positions 46b is equal to five times the distance between centers of the lugs 112 minus the width of one lug 112. Stated broadly, the distance between the inner sides of the plungers may be n times the distance between the centers of lugs 112 plus the width of one lug, while the distance between the outer sides of the plungers is $(n+1)$ times the distance between lug centers plus the width of a lug, where n is any whole number.

The distance between the centers of the plungers in positions 46a is equal to four times the distance between centers of lugs 112 plus the width of a lug 112 plus the width of one plunger, and the distance between the centers of the plungers in positions 46b is equal to five times the distance between the centers of lugs 112 minus the width of one lug minus the width of one plunger. Stated broadly, the distance between the centers of the plungers may be n times the distance between lug centers plus the width of one lug plus the width of one plunger and may also be defined as equal to $(n+1)$ times the distance between lug centers minus the width of one lug minus the width of one plunger, wherein n is any whole number.

The front and rear chains 28, 30 and the carriage 32 of each tie-down assembly 26 form a triangle. The front chain 28 extends downward from hook 70 in a forward direction to the front end of the carriage and the rear chain 30 extends downward from hook 70 in a rearwaed direction to the rear end of the carriage. The collars 68 and cylinders 42 on which they turn provide tension members normally holding the chains tight between the hook 70 and the anchor plate 90. Hence when the vehicle is secured by a tie-down assembly 26, it is thereby restrained from movement either in a forward or a rearward direction, the front chain applying forward tension and the rear chain applying rearward tension. When loading a vehicle in a forward direction and pulling a tie-down assembly 26 hooked to the underframe end with its carriage engaged in a channel guide 14, it is the rear chain 30 which pulls the tie-down assembly along. When the vehicle is tied down however it must be restrained from movement in both directions and accordingly a simple rear chain would not ordinarily be sufficient particularly for the front tie-down assemblies. The front chains 28 prevent rearward shifting of the tied down vehicle and the rear chain prevents forward shifting thereof. The body portion 78 of the hook 70 to which the chains are connected and the hook portion 82 are close to one another so that the chains will not swing appreciably when under stress and hence will not allow significant movement of the tied down vehicle. The triangle formed by the two chains 28 and 30 and the carriage 32 keeps all members tight as long as the frame 72 of the vehicle does not depress too much. This assures evenness of movement as the tie-down assembly 26 moves along the guide 14 and assures proper action under dynamic forces.

The front chain 28 preferably forms an angle of about 45° to the channel guide 14 to both hold down the vehicle and prevent it from moving backwards. The rear chain 30 serves to hold down the vehicle and prevent it from moving forward. It also preferably is about 45° to the channel guide although since it serves also to drag the carriage along in the channel during normal forward loading of the vehicles, it is sometimes set at an angle of as low as 30° as shown. The angle of both chains may vary, but preferably is between about 30° and about 60° to the channel guide 14. The chains are drawn tight and are preferably under tension when the vehicle is tied down on the deck of the rail car. The tension in the chains places the carriage 32 in compression.

Figure 4:
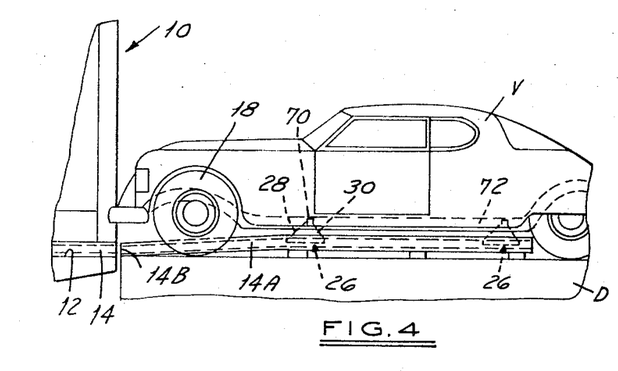
FIG. 4 is a fragmentary side elevational view showing a vehicle on a dock ready to be loaded onto a rail car.

The vehicles may be loaded on the rail car by drivers or by a suitable loading mechanism. FIG. 4 shows the vehicles on a loading dock D before they are moved onto the rail car. Parallel channel guides 14A, spaced apart the same distance as channel guides 14 on the rail car, are mounted on the dock. The channel guides 14A are openended and of the same cross section as channel guides 14. The rail car is shown in position for loading adjacent the dock with the ends of the channel guides 14 on the rail car substantially abutting the open ends 14B of the channel guides 14A on the dock and with the carriages 32 in channel guides 14A. Preferably the channel guides 14A are elevated slightly with respect to the top surfaces of the dock on which the vehicle wheels travel so that the chains 28, 30 of each tie-down assembly may be hooked to a vehicle underframe and the chains pulled through tunnels 66 of carriages 32 around collars 68 and inserted in the anchor plate slots 92 with as much tightness as desired or necessary. The collars 68 turn freely to permit the chains to be pulled through the tunnels with ease.

The channel guides 14A lead down to their open ends 14B so that as the vehicle is moved from the dock to the rail car, the carriages 32 move from channel guides 14A on the dock to channel guides 14 on the rail car and place the chains 28, 30 under significant tension. The amount of tension in the chains and also the amount the vehicle springs are depressed depends on the shape of the dock channel guides 14A and the tightness or amount of slack if any in the chains when the chains are inserted in the slots 92.

After a line of vehicles has been loaded in proper position on the deck 12 of the rail car, whether by power mechanism or by individual drivers, a tool may be applied to the ends of the locking bars 102 to rotate them from the dotted line position of FIG. 12 to the solid line position thereof. The ratchet assemblies 120 will prevent reverse rotation of the locking bars. The plungers 46 being extended by their springs 54 to the positions of FIGS. 5 and 9, extend across the plane defined by the vertical locking lugs 112 in the locked position of the locking bars 102. If one of the plungers happens to be in the path of a locking lug 112, it will be pushed back to a retracted position by that particular locking lug when the locking bar 102 is rotated to its locking position. The dimensions are such that one only of the plungers on each carriage can be aligned with a locking lug. Accordingly, the other plunger 46 not aligned with a locking lug will extend into the space 114 between two locking lugs on the bar 102, restraining the carriage from moving in its channel guide beyond the limits of the two lugs defining the space. Any shifting of the carriage, which may take place during initial movement of the rail car will shift the carriage slightly one direction or the other until the retracted plunger 46 moves out of line with the locking lug holding it retracted, whereupon the retracted plunger will snap out to its extended position. At that point the carriage is tightly locked against movement in either direction by its two plungers assuming the 46a position or the 46b position with respect to the locking lugs as shown in FIG. 10.

Because the locking lugs extend continuously throughout the full length of the locking bars, the vehicles need only to be roughly positioned along the length of the rail car. Then after the locking bars 102 are swung to their operative or locking positions to lock each carriage by at least one of its plungers, and upon subsequent movement of the carriage a distance no greater than the distance the engaged plunger can move in the space between two adjacent locking lugs, both plungers will engage in one of the two positions of FIG. 10 to tightly lock the carriage against movement.

All of the carriages will be locked simultaneously since all of the locking segments 110 are disposed in a line on one side of the locking bars. The chains provide a flexible tie to the underframe of the vehicle so as to reduce the stresses thereon. As noted above, the hook is so constructed that the chain ends terminate close to the point of connection to the underframe of the vehicle and hence will minimize any possible movement of the vehicle.

The vehicles may be unloaded by moving the rail car into the same position with respect to a dock D as shown in FIG. 4. The vehicles are unlocked by reverse rotation (clockwise in FIG. 12) of the locking bars 102 to disengage the locking lugs. The vehicles may then be driven from the rail car onto the dock D, dragging the carriages along with them. The carriages will slide from the channel guides 14 on the rail car into the channel guides 14A on the dock. Since the channel guides 14A are elevated slightly as previously noted, the tie-down assemblies may be easily unhooked from the vehicles when the vehicles are on the dock. Thereafter, the tie-down assemblies may be slid back manually into the channel guides 14 on the rail car so that the rail car with the carriages may be returned to its point of origin for another load of vehicles.

Figure 15:
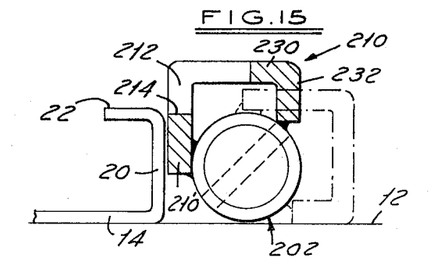
FIG. 15 is a view similar to FIG. 12 but showing a locking bar having a modified construction. The bar is seen in locking position in solid lines and in retracted position in dot-dash lines.
Figure 16:
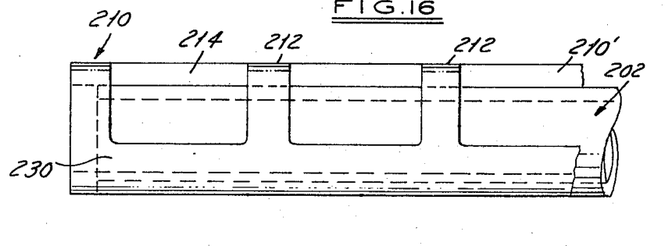
FIG. 16 is a fragmentary side elevational view of the structure of FIG. 15 shown retracted.

FIGS. 15 and 16 show a modified locking bar 202 which differs from locking bar 102 only in the construction of the elongated members 210 on which the locking lugs 212 are formed. Members 210 are of the cross section shown in FIG. 15 and each has an elongated flat flange 210' secured as by welding to the locking bar. Flange 210' is like the locking member 110 described above, being notched along its length to provide equally spaced locking lugs 212 separated by spaces 214. Such locking lugs and spaces are dimensioned the same and function the same as locking lugs 112 and spaces 114 described above. However, member 210 includes a portion 230 integral with the upper ends of lugs 212 which portion constitutes an extension of flange 210' at right angles thereto and terminating in a downturned portion 232 parallel to flange 210' and secured as by welding to the bar 202. The spaces 214 are continued into the portion 230 of the locking member 210 to clear the carriage plungers 46. The locking bar 202 including its locking members 210 function the same as locking bar 102. However, locking members 210 have been found to be easier to manufacture than locking members 110.

What we claim as our invention is:

1. Apparatus for securing a vehicle on the elongated deck of a transport, comprising guide means including a rail secured upon and extending lengthwise of the deck, a carriage mounted on said rail for movement lengthwise thereof, means for securing said carriage against movement with respect to said rail, means for connecting said carriage to the underframe of the vehicle comprising a rear flexible link chain extending from the rear portion of said carriage, a front flexible link chain extending from the front portion of said carriage, a connecting member joined to the ends of said link chains and adapted to be connected to the underframe of the vehicle so that said rear link chain extends downwardly and rearwardly therefrom to said carriage to restrain the vehicle from forward movement and said front link chain extends downwardly and forwardly therefrom to said carriage to restrain the vehicle from rearward movement, means on said carriage engageable with any link of each chain depending on the distance between said carriage and the underframe of the vehicle to hold said chain in tension, said last-mentioned means comprising an anchor member having a slot of a width greater than the thickness but less than the width of the links of said chains and open at one end to receive a link inserted edgewise therein, and a tension member for each chain engaging the same between said connecting member and said anchor member.

2. Apparatus for securing a vehicle on the elongated deck of a transport, comprising guide means including a rail secured upon and extending lengthwise of the deck, a carriage mounted on said rail for movement lengthwise thereof, means for securing said carriage against movement with respect to said rail, means for connecting said carriage to the underframe of the vehicle comprising a flexible linear member extending from said carriage, a connecting member for connecting the end of said linear member to the underframe of the vehicle, and means for taking up said linear member to adjust the length thereof in accordance with the distance between said carriage and the underframe of the vehicle and to hold said linear member in tension, said linear member being a link chain, said last-mentioned means comprising an anchor plate on said carriage having a slot of a width greater than the thickness but less than the width of the links of said chain and open at one end to receive a link inserted edgewise therein, and a tension member on said carriage under which said chain passes between said connecting member and said anchor plate.

3. Apparatus for securing a vehicle on the elongated deck of a transport, comprising guide means including a rail disposed upon and extending lengthwise of the deck, a carriage slidably engageable with said rail for movement lengthwise thereof, means for connecting said carriage to the vehicle, and locking mechanism operable to lock said carriage against movement and thereby secure the vehicle in substantially fixed position on the deck, said locking mechanism comprising an elongated member mounted on the deck along one side of said rail and having a plurality of locking lugs equally spaced apart longitudinally thereof, said elongated member being movable between locking and released positions, said carriage having locking elements spaced apart lengthwise of said elongated member, said locking elements on said carriage comprising plungers extending transversely of said elongated member and being retractable from a normally extended position, said plungers when extended being engageable in the spaces between said locking lugs on said elongated member in the locking position of said elongated member to lock said carriage as aforesaid and being disengageable therefrom in said released position of said elongated member to release said carriage, said plungers being adapted to retract if contacted by a locking lug aligned therewith during movement of said elongated member from its released to its locking position.

4. The apparatus defined in claim 3, wherein said elongated member is rotatable between locking and released positions.

5. The apparatus defined in claim 3, wherein means are provided resiliently urging said plungers to their extended positions.

6. The apparatus defined in claim 3, wherein the spacing and width of said plungers being such that they will lock against the remote sides of two locking lugs and alternatively against the adjacent sides of two locking lugs.

7. The apparatus defined in claim 3, wherein the distance between the inner sides of said plungers $= n \times d + w$ and the distance between the outer sides of said plungers $= (n+1) \times d - w$, wherein $n$ is any whole number
$d$ is the distance between lug centers
$w$ is the width of said lugs.

8. The apparatus defined in claim 3, wherein the distance between plunger centers $= n \times d + w_1 + W_2$ and also $= (n+1) \times d - (w_1 + w_2)$ wherein $n$ is any whole number
$d$ is the distance between lug centers
$w_1$ is the width of the lugs
$w_2$ is the width of the plungers.

9. The apparatus defined in claim 7, including means for resiliently urging said plungers to their extended positions, the spacing and width of said plungers being such that they will lock against the remote sides of two locking lugs and alternatively against the adjacent sides of two locking lugs.

10. Apparatus for securing a vehicle on the elongated deck of a transport, comprising guide means including a rail secured upon and extending lengthwise of the deck, a carriage mounted on said rail for movement lengthwise thereof, means for securing said carriage against movement with respect to said rail, means for connecting said carriage to the underframe of the vehicle comprising a rear flexible link chain extending from the rear portion of said carriage, a front flexible link chain extending from the front portion of said carriage, a connecting member joined to the ends of said link chains and adapted to be connected to the underframe of the vehicle so that said rear link chain extends downwardly and rearwardly therefrom to said carriage to restrain the vehicle from forward movement and said front link chain extends downwardly and forwardly therefrom to said carriage to restrain the vehicle from rearward movement, means on said carriage engageable with any link of each chain depending on the distance between said carriage and the underframe of the vehicle to hold said chain in tension, said last-mentioned means comprising an upright anchor plate for each chain having a vertical slot of a width greater than the thickness but less than the width of the links of said chains and open at the top to receive a link inserted edgewise therein, and a transverse tension member on said carriage for each chain under which the same passes between said connecting member and said anchor member.

11. The apparatus defined in claim 10, wherein said anchor plates are spaced apart lengthwise of said carriage to provide a space therebetween for the accumulation of unused chain, and said chains are portions of the same continuous link chain member.

12. Apparatus for securing a vehicle on the elongated deck of a transport, comprising guide means including a rail secured upon and extending lengthwise of the deck, a carriage mounted on said rail for movement lengthwise thereof, means for securing said carriage against movement with respect to said rail, means for connecting said carriage to the vehicle comprising a link chain extending from said carriage and being adapted to be connected to the underframe of the vehicle, and means for taking up said link chain to adjust the length thereof in accordance with the distance between said carriage and the underframe of the vehicle and to hold said link chain in tension, said last-mentioned means comprising an anchor plate on said carriage having a slot of a width greater than the thickness but less than the width of the links of said chain and open at one end to receive a link inserted edgewise therein, and a tension member on said carriage under which said chain passes between said anchor plate and the vehicle.

13. A carriage for use in a tie-down structure which includes a longitudinally extending guide adapted to be anchored lengthwise upon a longitudinally extending deck of a transport and which is adapted to secure a vehicle on such deck, said carriage being adapted to be carried by and locked in longitudinally adjusted position on the guide, means on said carriage adapted to take up a flexible link chain to adjust the length thereof in accordance with the distance between said carriage and the underframe of a vehicle to which the link chain is adapted to be connected, said lastmentioned means comprising an anchor plate on said carriage having a slot of a width greater than the thickness but less than the width of the links of the chain and open at one end to receive a link inserted edgewise therein, and a tension member on said carriage under which the chain is adapted to pass between said anchor plate and the vehicle.

14. The carriage defined in claim 13, including means adapted to take up a second flexible link chain comprising a second anchor plate on said carriage having a slot of a width greater than the thickness but less than the width of the links of the second chain and open at one end to receive a chain link inserted edgewise therein, said anchor plates being spaced apart lengthwise of said carriage to provide a space for the accumulation of unused chain, and a second tension member on said carriage under which the second chain is adapted to pass between said second anchor plate and the vehicle, said first-mentioned tension member and said second tension member extending transversely of said carriage at the front and rear respectively thereof.

15. The carriage defined in claim 14, said carriage having locking elements for securing said carriage in adjusted position along the guide, said locking elements being carried by said tension members and being spring urged to extended positions.

16. Apparatus for securing a vehicle on the elongated deck of a transport, comprising guide means including a rail disposed upon and extending lengthwise of the deck, a carriage slidably engageable with said rail for movement lengthwise thereof, means for connecting said carriage to the vehicle, and locking mechanism operable to lock said carriage against movement and thereby secure the vehicle in substantially fixed position on the deck, said locking mechanism comprising an elongated member mounted on the deck parallel and adjacent to said rail and having a plurality of locking lugs equally spaced apart longitudinally thereof, said elongated member being movable between locking and released positions, said carriage having locking means comprising a plunger extending transversely of said elongated member and being spring-urged to a normally extended position, said plunger when extended being engageable in the spaces between said locking lugs on said elongated member in the locking position of said elongated member to lock said carriage as aforesaid, and being disengageable therefrom in said released position of said elongated member to release said carriage, said plunger being adapted to retract if contacted by a locking lug aligned therewith during movement of said elongated member from its released to its locking position.

* * * * *

UNITED STATES PATENT OFFICE
CERTIFICATE OF CORRECTION

Patent No. 3,854,424          Dated December 17, 1974

Inventor(s) DONALD J. BLUNDEN and ISRAEL D. PEISNER

It is certified that error appears in the above-identified patent and that said Letters Patent are hereby corrected as shown below:

In the Claims;

Claim 9, Column 10, Line 38, "Claim 7" should read -- Claim 3 --.

Signed and sealed this 4th day of March 1975.

(SEAL)
Attest:

RUTH C. MASON
Attesting Officer

C. MARSHALL DANN
Commissioner of Patents
and Trademarks